(12) United States Patent
Ramirez et al.

(10) Patent No.: US 11,066,926 B2
(45) Date of Patent: Jul. 20, 2021

(54) SYSTEMS AND METHODS FOR DOWNHOLE LOGGING WITH ENHANCED SENSITIVITY AND AZIMUTHAL RESOLUTION

(71) Applicant: Baker Hughes Oilfield Operations LLC, Houston, TX (US)

(72) Inventors: Marc Ramirez, Houston, TX (US); Feyzi Inanc, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/590,796

(22) Filed: Oct. 2, 2019

(65) Prior Publication Data

US 2020/0109622 A1 Apr. 9, 2020

Related U.S. Application Data

(60) Provisional application No. 62/741,724, filed on Oct. 5, 2018.

(51) Int. Cl.
*E21B 47/11* (2012.01)
*G01V 5/10* (2006.01)
(Continued)

(52) U.S. Cl.
CPC .............. *E21B 47/11* (2020.05); *G01V 5/107* (2013.01); *E21B 47/017* (2020.05); *E21B 47/085* (2020.05)

(58) Field of Classification Search
CPC ........ G01V 5/101; G01V 5/125; G01V 5/107; E21B 47/017; E21B 47/085; E21B 47/11
See application file for complete search history.

(56) References Cited

U.S. PATENT DOCUMENTS 2,806,147 A    9/1957   Stellmacher
5,091,644 A *  2/1992   Minette ................. E21B 47/085
                                             250/254
(Continued)

FOREIGN PATENT DOCUMENTS

DE         100 34 810        1/2002

OTHER PUBLICATIONS

International Search Report and Written Opinion dated Jan. 2, 2020 in corresponding PCT Application No. PCT/US19/54264.
(Continued)

*Primary Examiner* — David P Porta
*Assistant Examiner* — Fani Boosalis
(74) *Attorney, Agent, or Firm* — Hogan Lovells US LLP

(57) ABSTRACT

A downhole logging tool includes a radiation generation source operable to emit radiation into a formation surrounding the tool, a radiation detector fixed relative to the radiation generation source and operable to detect backscattered radiation from the formation surrounding the tool, and a sleeve positioned around the radiation detector to shield the radiation detector from a first portion of the backscattered radiation. The sleeve includes at least one aperture for exposing the radiation detector to a second portion of the backscattered radiation, in which the second portion of the backscattered radiation emanates from an inspected region of the formation facing the at least one aperture. A signal measured at the radiation detector corresponds to the inspected region of the formation, and the position of the at least one aperture is changeable with respect to the formation to distinctly inspect different regions of the formation.

20 Claims, 13 Drawing Sheets

(51) Int. Cl.
  *E21B 47/017*  (2012.01)
  *E21B 47/085*  (2012.01)

(56) References Cited

U.S. PATENT DOCUMENTS 5,481,105 A     1/1996  Gold
2004/0104821 A1* 6/2004  Clark ..................... G01V 5/04
                                                340/854.6

OTHER PUBLICATIONS

Marco F. Duarte et al., "Single-Pixel Imaging via Compressive Sampling," Mar. 2008, IEEE Signal Processing Magazine, pp. 83-91.
Microsoft Research, "Compressive Sensing," Sep. 6, 2016, https://www.youtube.com/watch?v=zytez36XICU.

* cited by examiner

602 — MEASUREMENTS FROM DETECTOR

604 — APERATURE FUNCTION (TRANSMISSION PATTERN)

606 — FORMATION SECTION SIGNAL LEVEL

600

$$\begin{vmatrix} y1 \\ y2 \\ y3 \\ y4 \\ y5 \\ y6 \\ y7 \\ y8 \\ y9 \\ y10 \\ y11 \\ y12 \end{vmatrix} = \begin{vmatrix} 1 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 \\ 0 & 0 & 0 & 1 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 1 & 0 & 0 & 0 \\ 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 1 \end{vmatrix} \times \begin{vmatrix} x1 \\ x2 \\ x3 \\ x4 \\ x5 \\ x6 \\ x7 \\ x8 \\ x9 \\ x10 \\ x11 \\ x12 \end{vmatrix}$$

$\phi$

FIG. 6

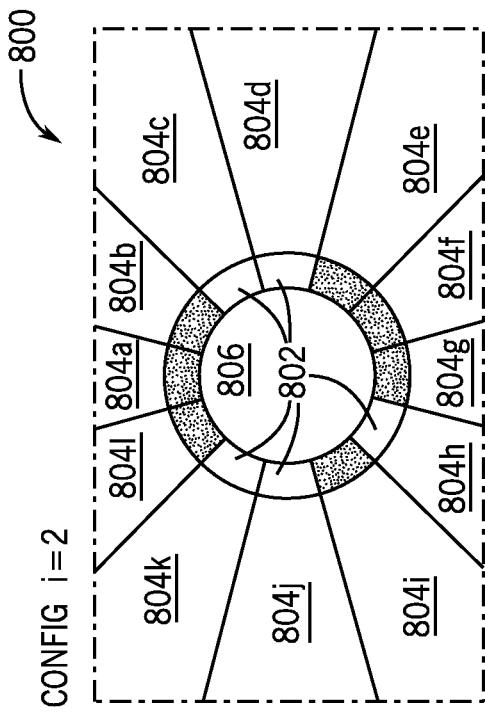
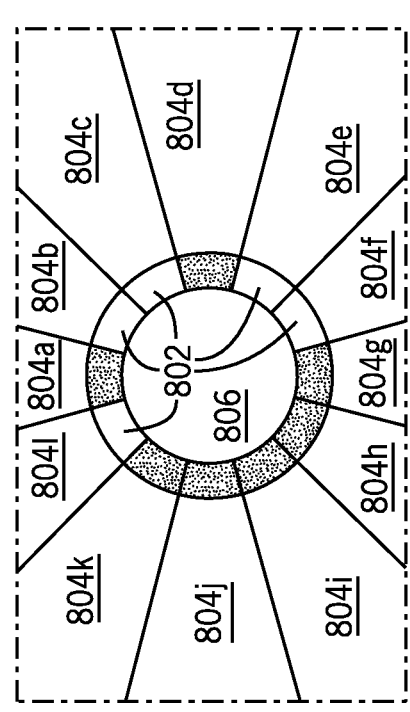
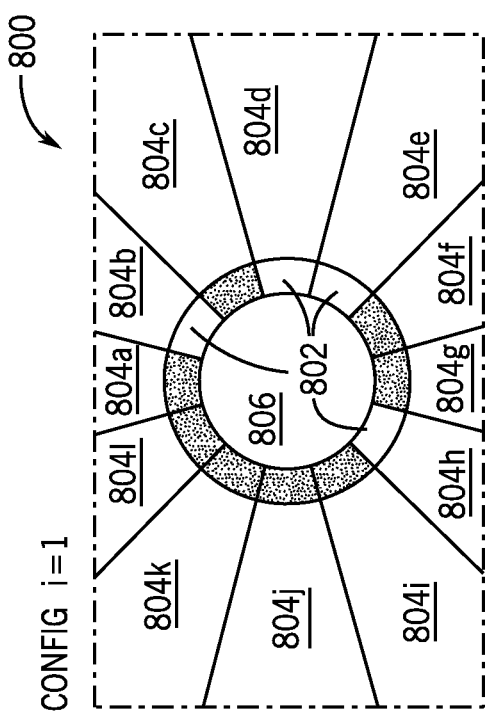
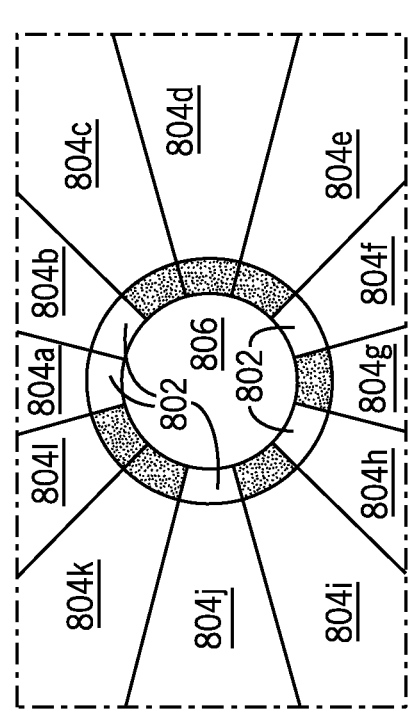
FIG. 8A
FIG. 8B
FIG. 8C
FIG. 8D

SYSTEMS AND METHODS FOR DOWNHOLE LOGGING WITH ENHANCED SENSITIVITY AND AZIMUTHAL RESOLUTION

CROSS REFERENCE TO RELATED APPLICATIONS

This application claims priority to U.S. Patent Application No. 62/741,724 filed Oct. 5, 2018 titled "SYSTEMS AND METHODS FOR DOWNHOLE LOGGING WITH COMPRESSED SENSING," the disclosure of which is incorporated herein by reference in its entirety.

FIELD OF INVENTION

This invention relates in general to downhole logging, and more particularly to systems and methods for performing improved downhole logging.

BACKGROUND

Downhole logging tools are used to collect various data about a wellbore or well system. For example, neutron-based logging tools may be used to detect annular defects in the well system. In previous neutron logging tools, a single detector that occupies a large cross-sectional area provides the highest sensitivity to formation neutrons, but only provides volumetric coverage without azimuthal resolution. Alternatively, multi-detector arrays provide some azimuthal resolution (e.g., about 90 degrees for a quad detector, and about 45 degrees for an 8-channel detector). However, the filling factor, or the ratio of detectors to available cross-sectional area, is greatly reduced, limiting overall sensitivity. Thus, in conventional and/or previous neutron logging tools, there is generally a tradeoff between detection sensitivity and azimuthal resolution.

BRIEF DESCRIPTION OF THE DRAWINGS

In an embodiment, a downhole logging tool includes a radiation generation source such as a neutron source operable to emit radiation into a formation surrounding the tool, a radiation detector fixed relative to the radiation generation source and operable to detect backscattered radiation from the formation surrounding the tool, and a sleeve positioned around the radiation detector to shield the radiation detector from a first portion of the backscattered radiation. The sleeve includes at least one aperture for exposing the radiation detector to a second portion of the backscattered radiation, in which the second portion of the backscattered radiation emanates from an inspected region of the formation facing the at least one aperture. A signal measured at the radiation detector corresponds to the inspected region of the formation, and the position of the at least one aperture is changeable with respect to the formation to distinctly inspect different regions of the formation. In some embodiments, the sleeve and the least one aperture are rotatable with respect to the radiation detector or the formation. In some embodiments, the sleeve includes one or more sections openable to create the one or more apertures. In some embodiments, the positions of the one or more apertures of the detector correspond respectively to one or more azimuthal directions with respect to the formation and are changeable across a plurality of different azimuthal directions. In some embodiments, the positions of the one or more apertures with respect to the formation are changeable across a plurality of different axial positions. In some embodiments, the sleeve includes a plurality of layers rotatable with respect to each other, each layer having a layer aperture, wherein a complete aperture occurs when the layer apertures of the plurality of layers are aligned. In some embodiments, a partial aperture occurs where at least a layer aperture of a first layer of the plurality of layers is aligned with a non-aperture portion a second layer of the plurality of layers.

In another embodiments, a system for performing downhole logging operations in a well includes a downhole suspension device and an inspection tool coupled to and lowerable into the well via the suspension device. The inspection tool includes a radiation source operable to emit radiation, a radiation detector operable to detect backscattered radiation generated as a result of the radiation emitted from the radiation source, and a sleeve positioned around the radiation detector. The sleeve includes at least one aperture, and the position of the at least one aperture is changeable with respect to the well. In some such embodiments, the sleeve and the least one aperture are rotatable with respect to the radiation detector. In some such embodiments, the sleeve includes one or more windows openable to create the one or more apertures. In some such embodiments, the positions of the one or more apertures are changeable across a plurality of different azimuthal positions of the well. In some such embodiments, the positions of the one or more apertures are changeable across a plurality of different axial positions of the well. In some such embodiments, the sleeve includes a plurality of layers rotatable with respect to each other, each layer having a layer aperture, wherein a complete aperture occurs when the layer apertures of the plurality of layers are aligned. In some such embodiments, a partial aperture occurs where at least a layer aperture of a first layer of the plurality of layers is aligned with a non-aperture portion a second layer of the plurality of layers.

In yet another embodiment, a method of performing downhole logging includes positioning an inspection tool in a well, the inspection tool having a radiation generation source, a radiation detector, and a sleeve positioned around the radiation detector at a first position with respect to the well, the sleeve including at least one aperture. The method further includes emitting radiation from the radiation generation source, detecting backscattered radiation received at the radiation detector via the at least one aperture, determining a first measurement based on the detected backscattered radiation, associating the first measurement with a first region of the well corresponding to the first position of the at least one aperture, and determining one or more characteristics of the first region of the well based at least in part on the first measurement. In some such embodiments, the method further includes changing the position of the at least one aperture to a second position with respect to the well, the second position corresponding to a second region of the well, determining a second measurement based on the backscattered radiation; associating the second measurement with the second region of the well, and determining one or more characteristics of the second portion of the well based at least in part on the second measurement. In some such embodiments, the method further includes moving the position of the at least one aperture axially with respect to the well. In some such embodiments, the method further includes moving the position of the at least on aperture azimuthally with respect to the well. In some such embodiments, the method further includes rotating the sleeve around the detector to change the position of the at least one aperture with respect to the well. In some such embodiments, the method further includes rotating the inspection tool to change the position of the at least one aperture with respect to the well.

BRIEF DESCRIPTION OF THE DRAWINGS

Figure 1:
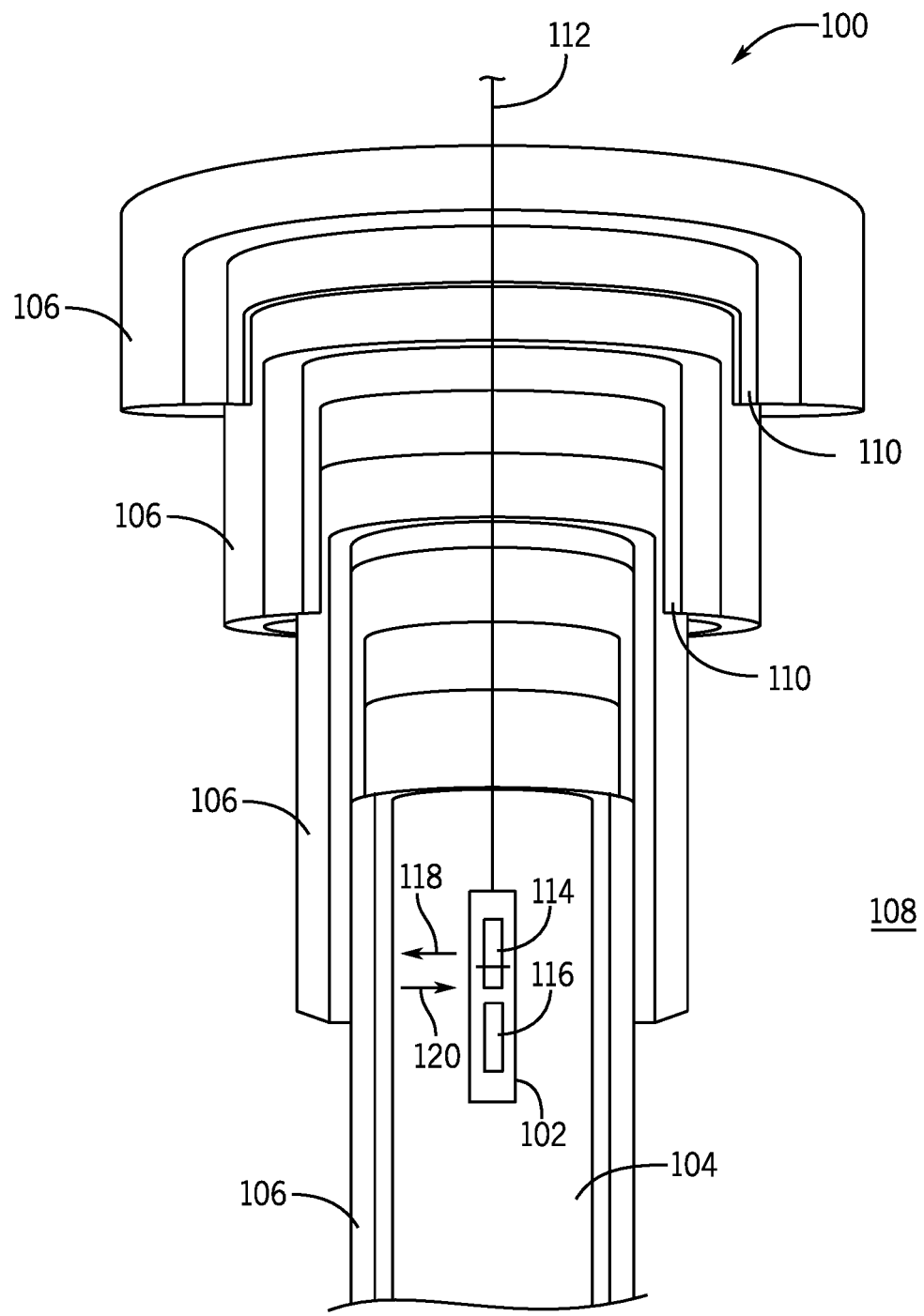

FIG. 1 illustrates a downhole logging tool positioned in a wellbore, in accordance with various embodiments.

Figure 2:
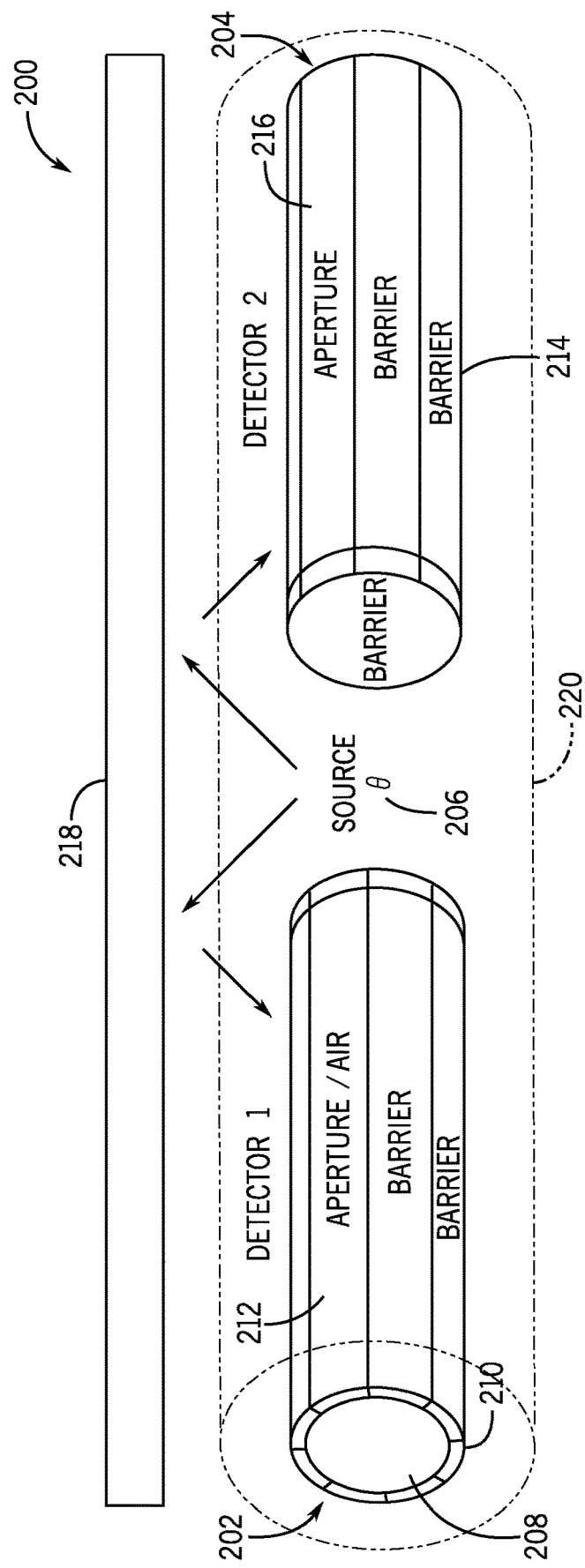

FIG. 2 illustrates a representation of an embodiment of a downhole logging tool with changing aperture positions, in accordance with various embodiments.

Figure 3:
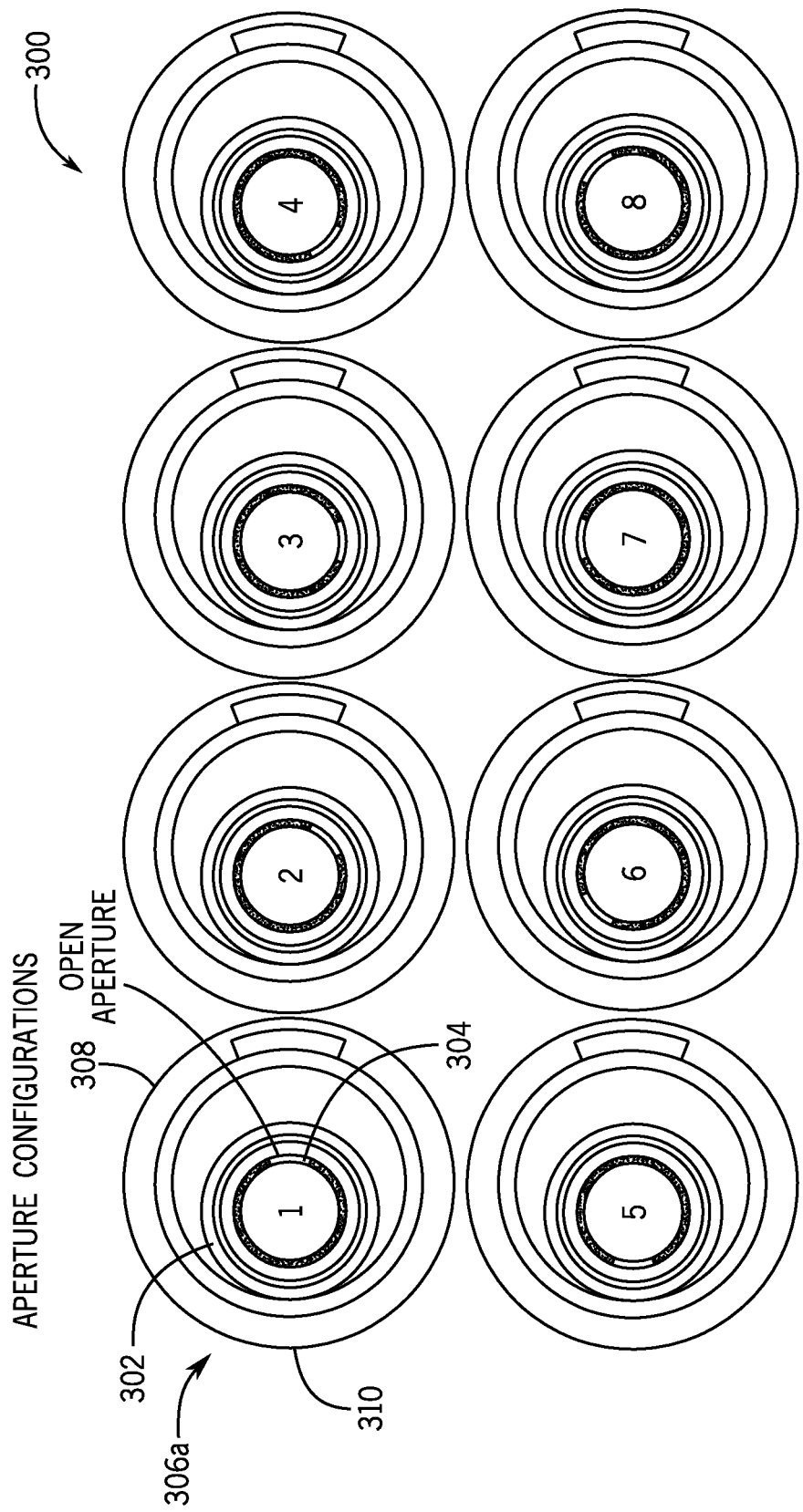

FIG. 3 illustrates a series of cross-sectional views of the downhole logging tool positioned inside a wellbore with the aperture at various positions, in accordance with various embodiments.

Figure 4:
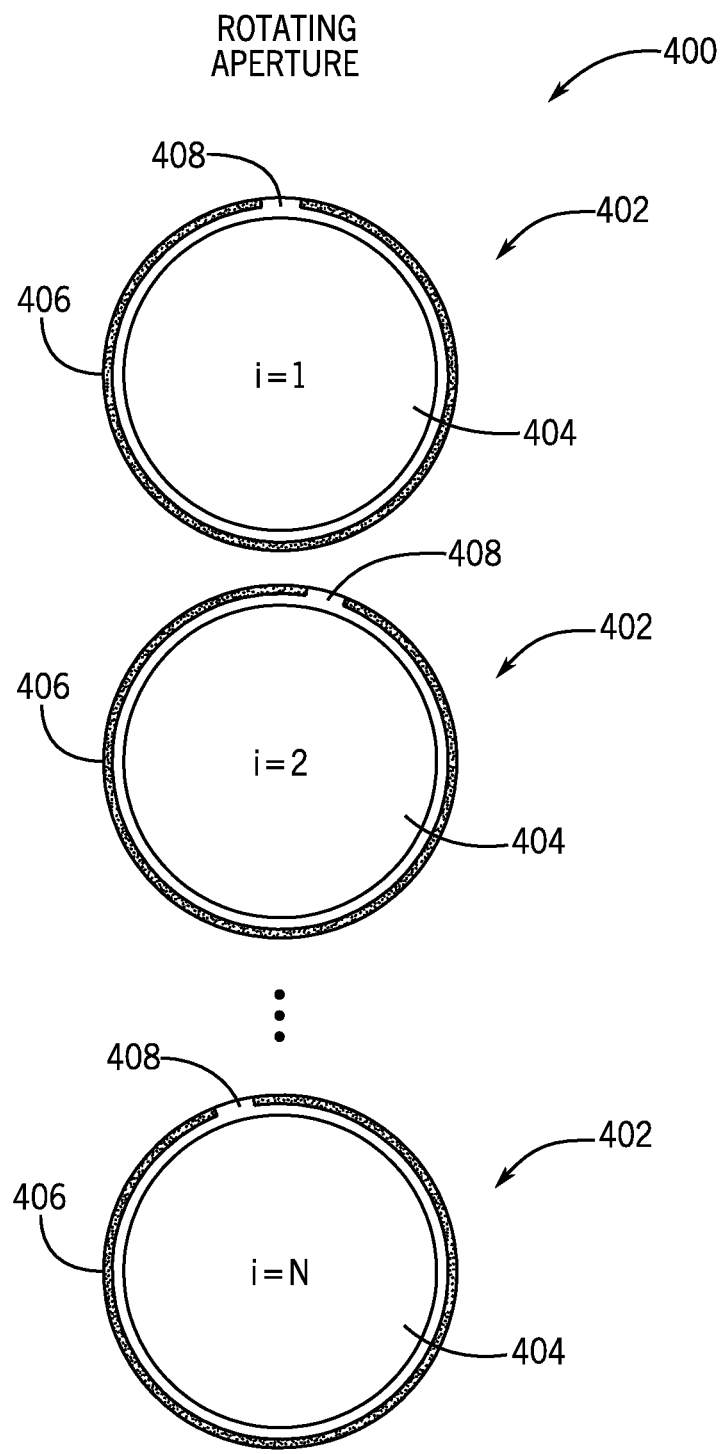

FIG. 4 illustrates an example representation of a downhole logging tool with changing aperture positions, in accordance with various embodiments.

FIGS. 5A-5D illustrate the aperture positioned at different azimuthal directions, in accordance with various embodiments.

FIG. 6 illustrates a representative function for obtaining measurements from a downhole logging tool with variable aperture positions, in accordance with various embodiments.

Figure 7:
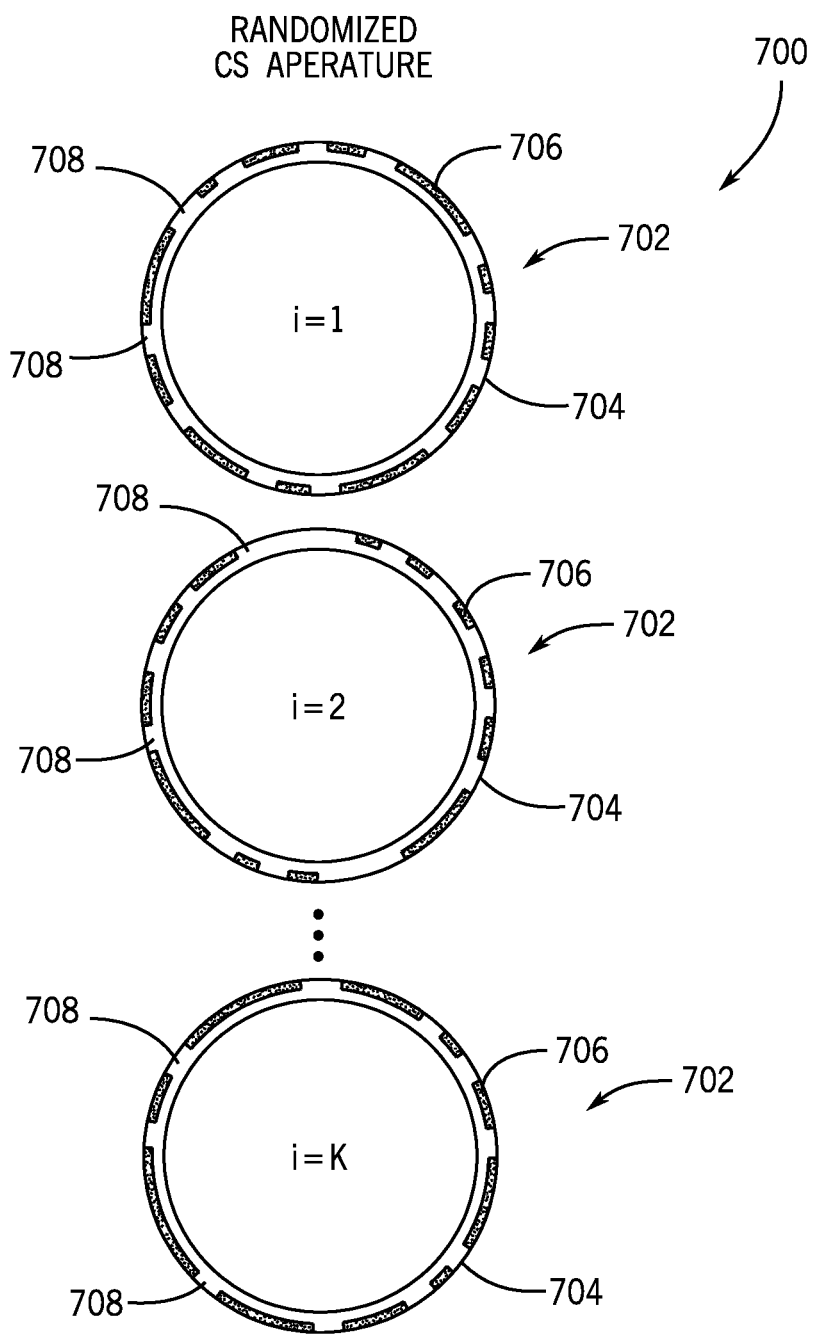

FIG. 7 illustrates an example representation of another embodiment of a downhole logging tool with multiple changing aperture positions, in accordance with various embodiments.

FIGS. 8A-8D illustrate the multiple apertures positioned at different azimuthal directions, in accordance with various embodiments.

Figures 9, 10:
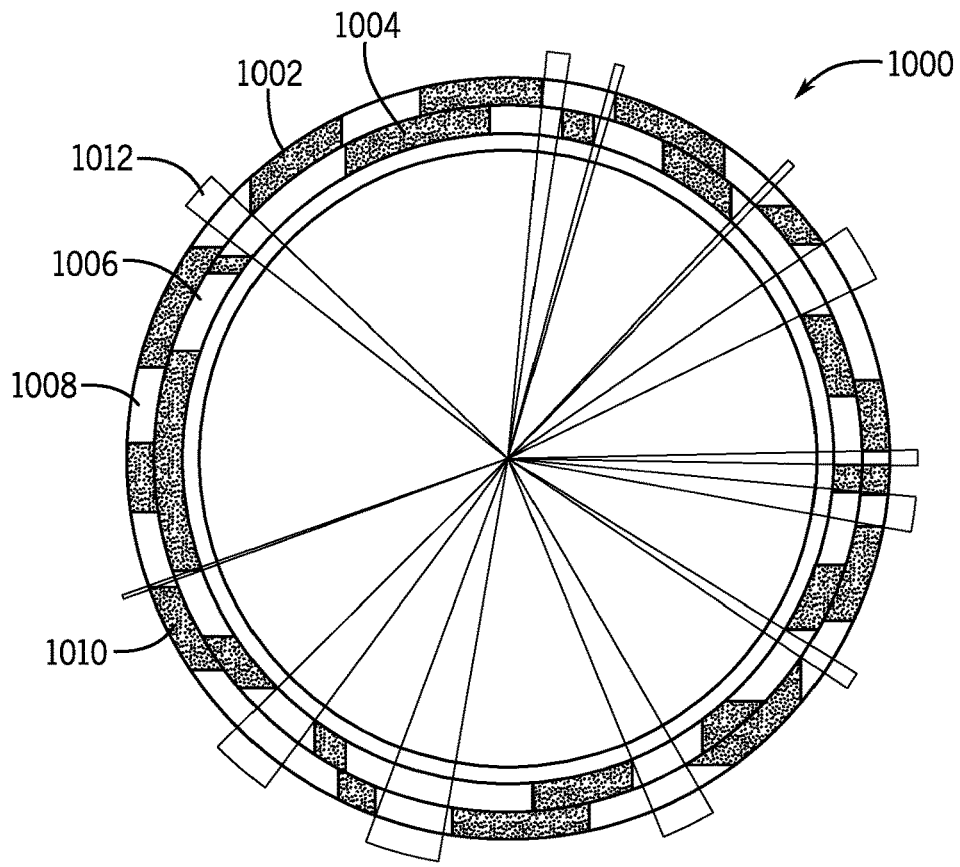

FIG. 9 illustrates a representative function for obtaining measurements from a downhole logging tool with multiple changing aperture positions, in accordance with various embodiments.

FIG. 10 illustrates a cross-sectional representation of a downhole logging tool with rotating sleeves for creating randomized aperture positions, in accordance with various embodiments.

Figure 11:
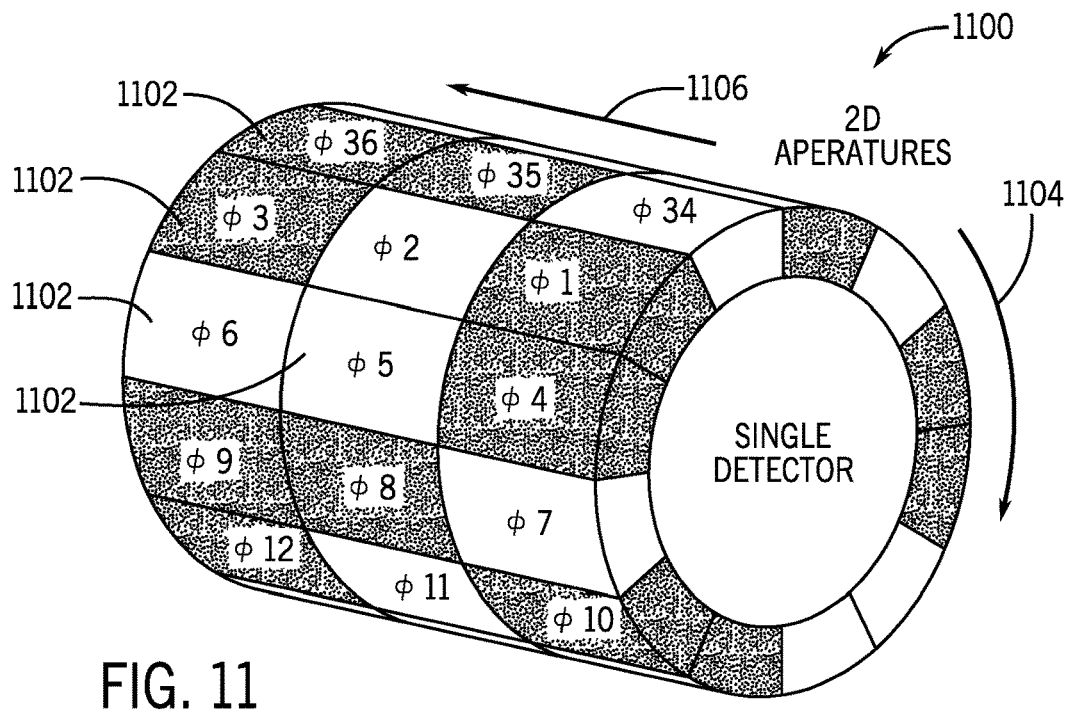

FIG. 11 illustrates a perspective view of a downhole logging tool with multiple changing apertures along the circumferential direction and along the longitudinal direction, with a single detector, in accordance with various embodiments.

Figure 12:
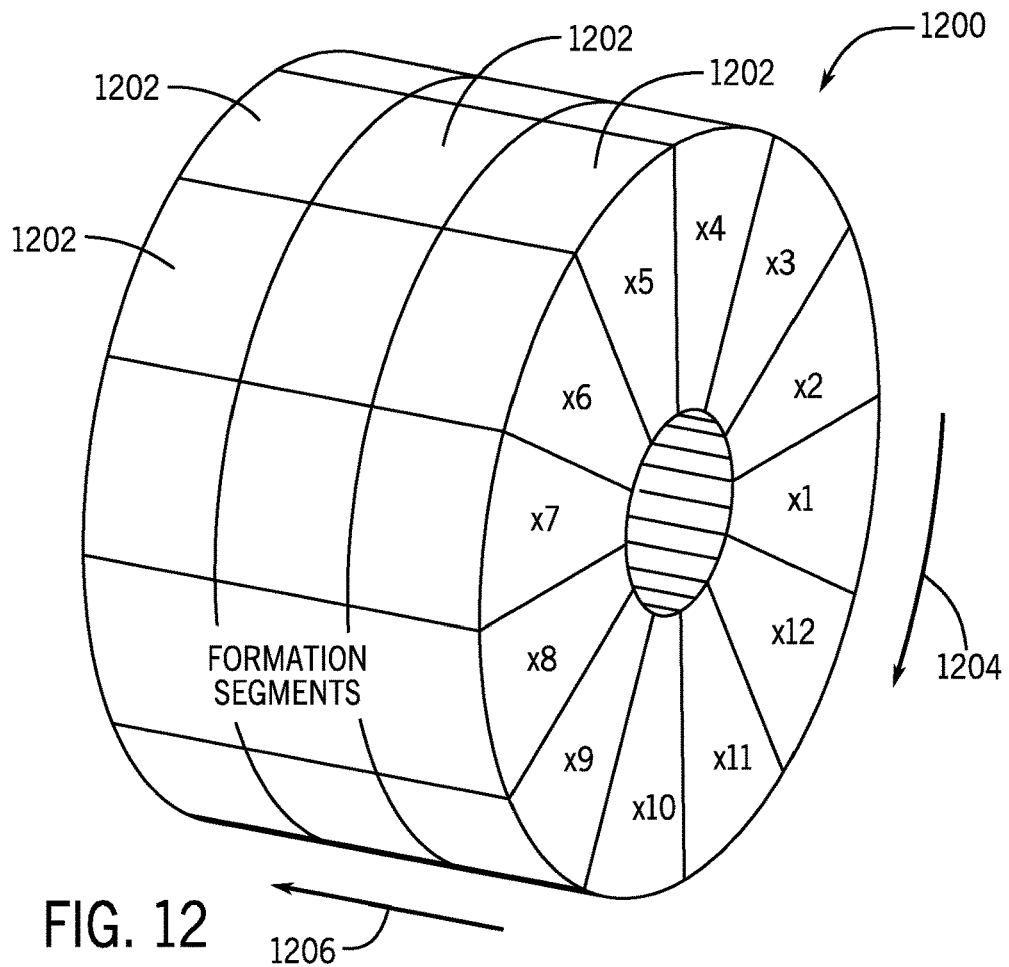

FIG. 12 illustrates spatial formation and/or wellbore segments corresponding to changing aperture positions, in accordance with various embodiments.

Figure 13:
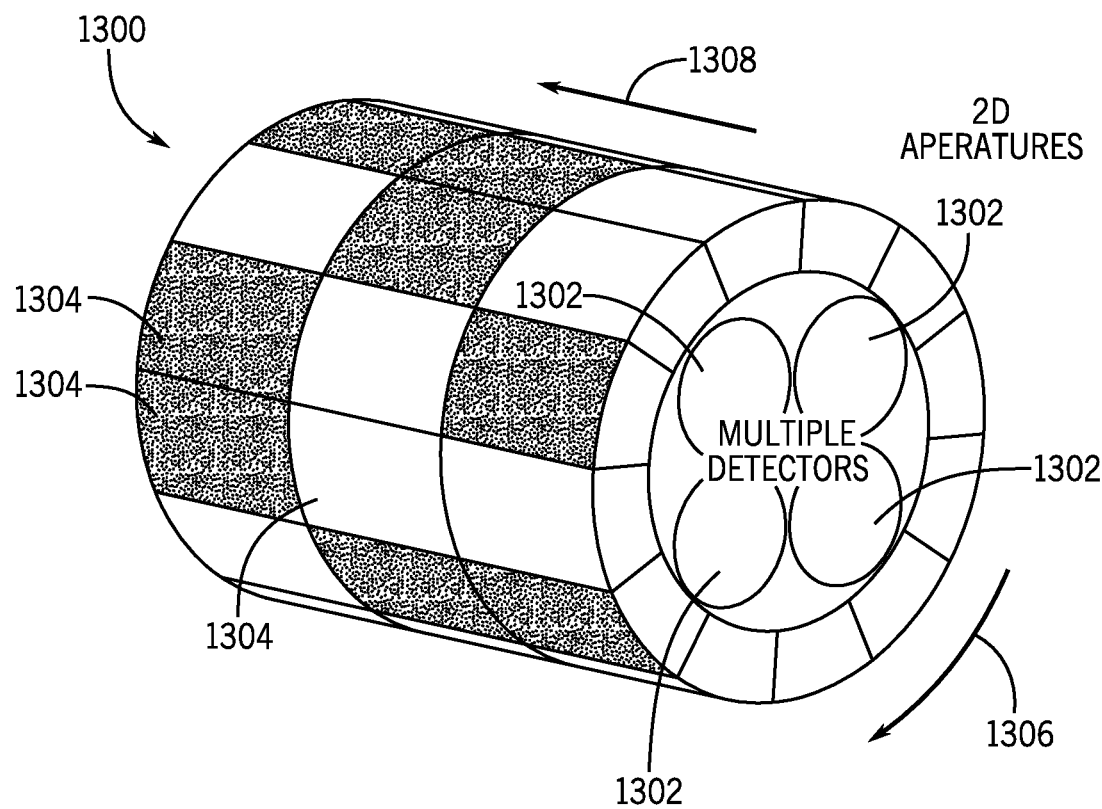
Figure 14A:
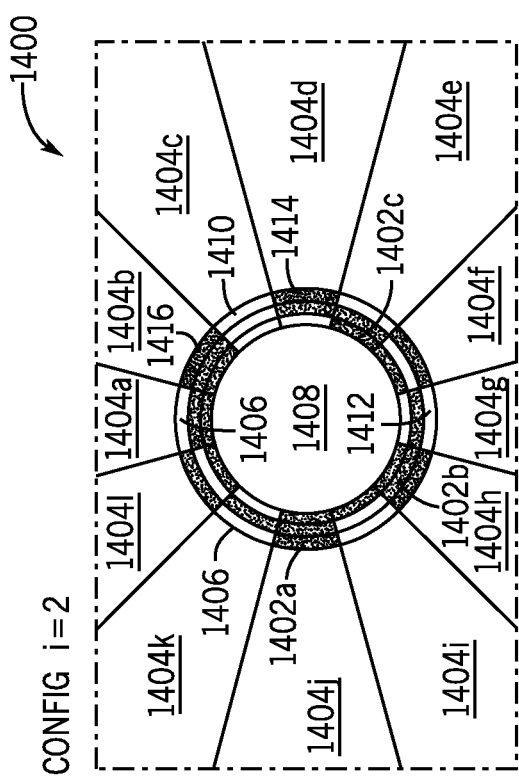
Figure 14B:
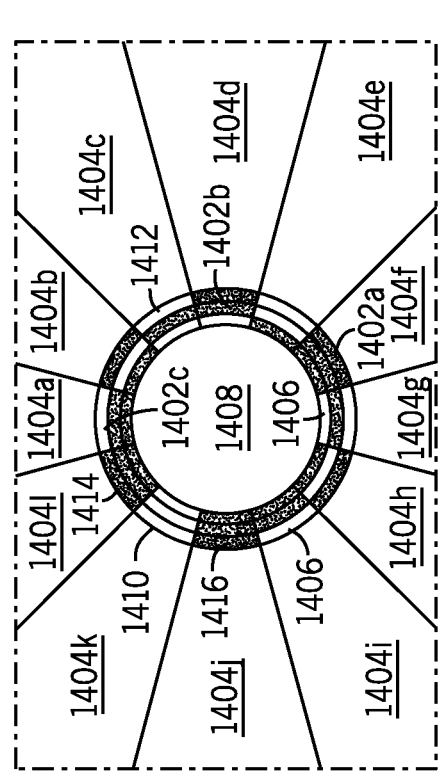
Figure 14C:
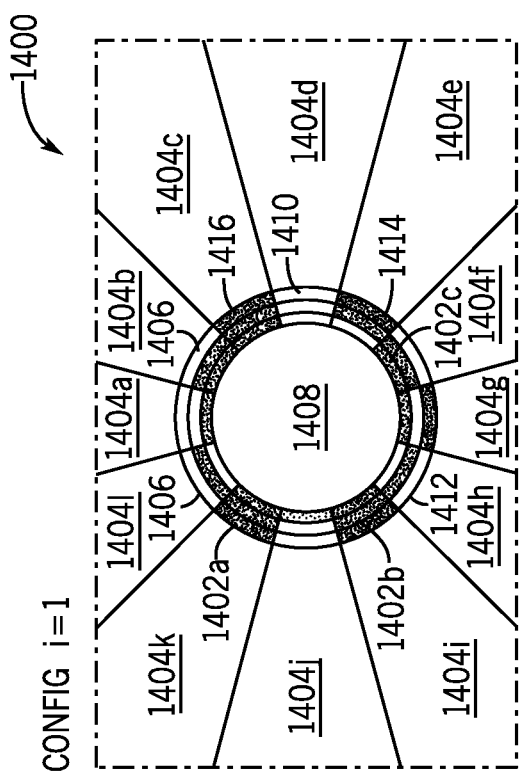
Figure 14D:
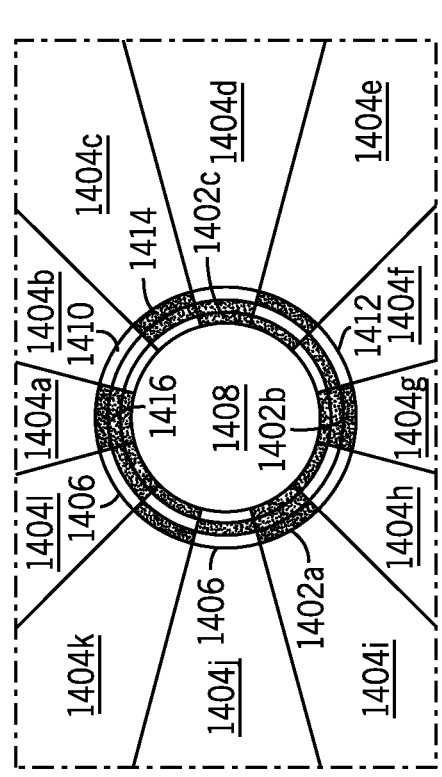

FIG. 13 illustrates a perspective view of a downhole logging tool with multiple detectors and multiple changing apertures along the circumferential direction and along the longitudinal direction, in accordance with various embodiments.

FIGS. 14A-14D illustrate a cross-sectional representation of a downhole logging tool with a plurality rotating sleeves for creating randomized apertures with varying degrees of openness, in accordance with various embodiments.

Figure 15:
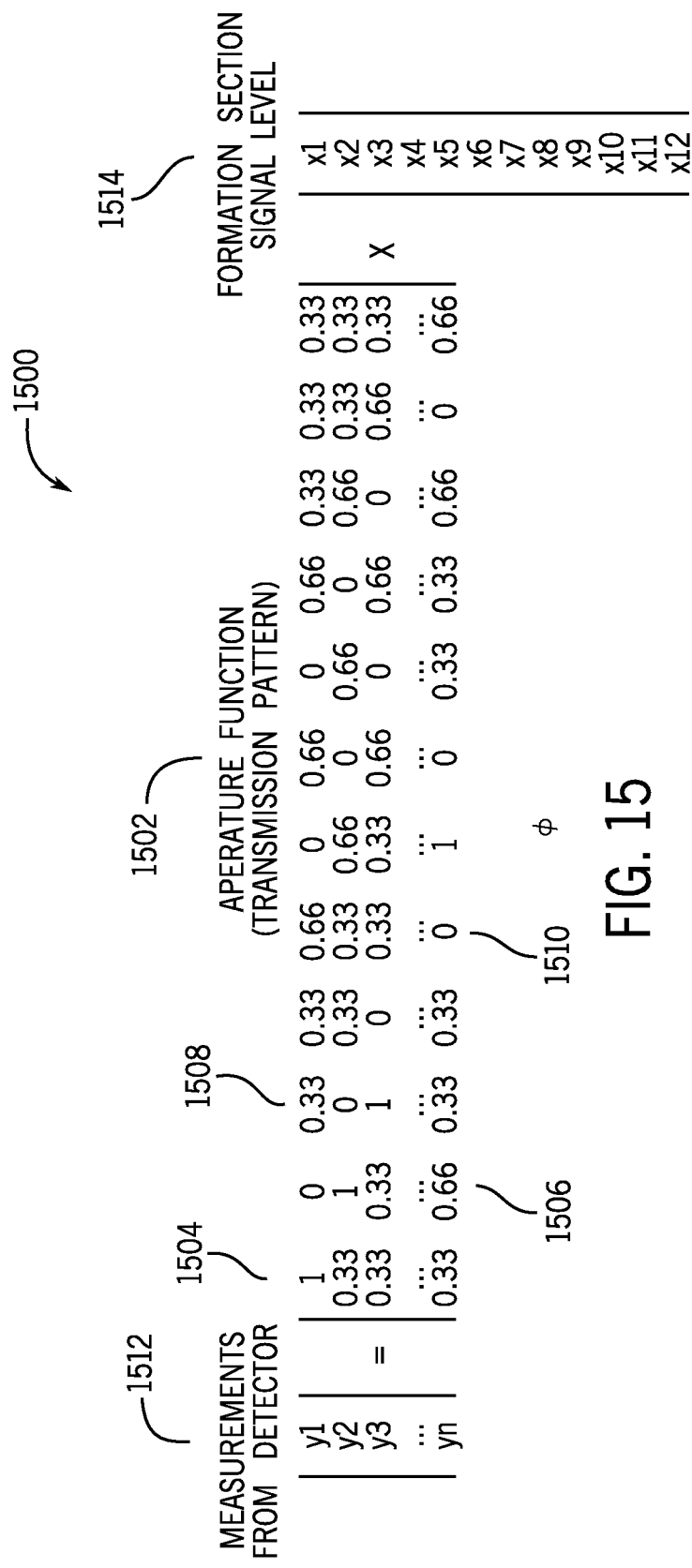

FIG. 15 illustrates a representative function for obtaining measurements from the downhole logging tool of FIG. 14 with apertures of varying degrees of openness, in accordance with various embodiments.

DETAILED DESCRIPTION OF THE INVENTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

In various embodiments, like components may be referred to with the same reference numerals throughout the specification. However, in certain embodiments, different reference numerals may be used for clarity. Additionally, components of a similar nature may be referred to with a reference numeral and a letter, such as A and B, for clarity, and should not be construed as limiting. For example, while similar components may be referred to with reference numerals and an associated A and B, there components may have different sizes, shapes, or different operational mechanisms.

FIG. 1 is a partial cross-sectional view of a well system 100 in which a downhole logging tool 102 is positioned to measure one or more characteristics of the well system 100, in accordance with one or more embodiments. The illustrated well system 100 includes a multi-barrier well 104 with a plurality of barriers 106, such as tubing, cement layers, casing, and the like. The well 104 may be any type of well, including but not limited to conventional and unconventional hydrocarbon producing wells. The logging tool 102 may be deployed downhole into the well 104 to perform various logging functions, such as detection of various anomalies, such as well defects, eccentricity, flaw structure, topology, integrity, and other information. In various embodiments, the logging tool 102 may include an imaging device such as a neutron imaging device, or various other types of logging devices such as acoustic devices, electromagnetic devices, magnetic resonance devices, other forms of radiation-based devices, among others.

In the illustrated embodiment, the well system 100 includes a series of tubular barriers 106, which may include metallic casings or tubings and cement walls between the casings. Specifically, in various embodiments, the wellbore may be cased by the tubular casings and held into place against the formation 108 and/or other casing sections via cement forming the cement walls. It may be desirable to inspect various characteristics of the casing and/or the cement walls, for example for potential abnormalities or defects such as fluid channel defects, bonding defects, air voids, defects in the casing, annulus defects, cement bonding defects, eccentricity of the well, among others. These abnormalities or defects may be referred to as wellbore characteristics and may further include additional information such as formation properties and the like.

In the illustrated embodiment, the logging tool 102 traverses into the well 104 along a well axis and is supported by a wireline 112, which may be a cable reinforced for wellbore operations and further including conductive materials to transfer energy and data signals. It should be appreciated that while a wireline system is illustrated in FIG. 1, embodiments of the present disclosure may be disposed on rigid tubing, coiled tubing, and with various other wellbore tubing structures.

It should be appreciated that various embodiments discussed herein describe logging tool 102 as a neutron radiation imaging tool, which may include a radiation generation unit 114 and a radiation detection unit 116. The radiation generation unit 114 may emit a flux of radiation toward the formation 112 and possibly through one or more barriers, which may interact with one or more targets and produce a backscatter stream of radiation toward the radiation detection unit 116. In various embodiments, the radiation generation unit 114 is a pulsed neutron generator that emits neutrons for a period of time and then stops emitting neutrons. For example, the pulsed neutron generator may be a D-T generator that emits neutrons for approximately 60 microseconds and then stops emitting neutrons for a period of time. As a result, in various embodiments where the neutron generation unit is a pulsed neutron generator, the formation 112 may be initially flooded with high energy fast neutrons, which may be referred to as the burst gate, and then contain predominantly (or entirely in certain embodiments) thermal neutrons what may be referred to as a thermal gate or capture gate. The radiation detection unit 116 may include a plurality of neutron detectors that, through neutron absorption, detect the presence of neutrons, such as thermal neutrons. The detection of the neutrons may be referred to as neutron imaging data and may be utilized to detect the wellbore characteristics. For example, in some embodiments, the logging tool 102 may include a neutron modality to detect annular defects. Although the present disclosure uses neutron logging tools as an example, in some embodiments, the logging tool 102 may include an X-ray logging tool. In some embodiments, the logging tool 102 may include a gamma tool. In some embodiments, the logging tool 102 may include an electromagnetic imaging tool.

In previous neutron logging tools, a single detector that occupies a large cross-sectional area provides the highest sensitivity to formation neutrons, but only provides volumetric coverage without azimuthal resolution. Alternatively, multi-detector arrays provide some azimuthal resolution (e.g., about 90 degrees for a quad detector, and about 45 degrees for an 8-channel detector). However, the filling factor, or the ratio of cross-sectional area the detectors occupy to the available cross-sectional area, is greatly reduced, limiting overall sensitivity. Thus, in conventional and/or previous neutron logging tools, there is generally a tradeoff between detection sensitivity and azimuthal resolution. The presently disclosed logging tool 102 is able to provide increased azimuthal resolution without any or with reduced loss in detection sensitivity.

FIG. 2 illustrates a representation of components of a downhole logging tool 200 with capability for variable aperture positions, in accordance with various embodiments. In the illustrated embodiment, the tool includes a radiation source 206, a first detector assembly 202 and a second detector assembly 204. The first detector assembly 202 includes a sleeve 210 substantially surrounding a detector 208, with the exception of an aperture 212 in the sleeve 210, exposing the detector 208. The sleeve 210 may be rotatable with respect to the detector 208 and/or with respect to the formation 218 such that the aperture may move between a plurality of positions around the detector and with respect to the formation 218. The sleeve 210 may be made of a material that blocks or partially blocks radiation. Similarly, the second detector assembly 204 includes a sleeve 214 substantially surrounding a detector, with the exception of an aperture 216 in the sleeve 214. When the tool 200 is downhole, and backscattered neutrons are traveling towards the detector assemblies 202, 204, the sleeves 210, 214 block all or a portion of the neutrons, except for neutrons directed toward at the apertures 212, 216. Thus, the measurement provided by the detectors can be attributed to the azimuthal direction corresponding to the position of the apertures 212, 216. In some embodiments, the source 206 and detector assemblies 202, 204 are inside a housing 220. The housing 220 may be made of a material that does not block (or at least partially permits) backscattered radiation. In some embodiments, the tool 200 includes electronics that keep track of the aperture positions and sizes. This information is then used in constructing aperture functions.

FIG. 3 illustrates a series of cross-sectional views 300 of the downhole logging tool 302 positioned inside a well 310 with the aperture 304 at various positions 306a-h with respect to the well, in accordance with various embodiments. The well 310 has a flaw 308 as a particular azimuthal position, which can be determined based on the measurements collected by the tool 302 while rotating the aperture 304. Specifically, the measurements collected by the tool 302 when the aperture 304 is facing the flaw 308 will be different than measurements collected by the tool 302 when the aperture 304 is not facing the flaw 308. Thus, the presence and location of the flaw 308 can be determined by the measurements.

FIG. 4 illustrates an example representation of a downhole logging tool 400 with changing aperture positions 402, in accordance with various embodiments. In this example, a single large detector 404 can be surrounded by a single-gap collimator 406 with one aperture 408 that rotates about the detector 404 to provide high azimuthal spatial resolution. Specifically, in this example, there are N number of discrete aperture positions 402, providing a corresponding azimuthal resolution of roughly 360°/N.

Figure 5A:
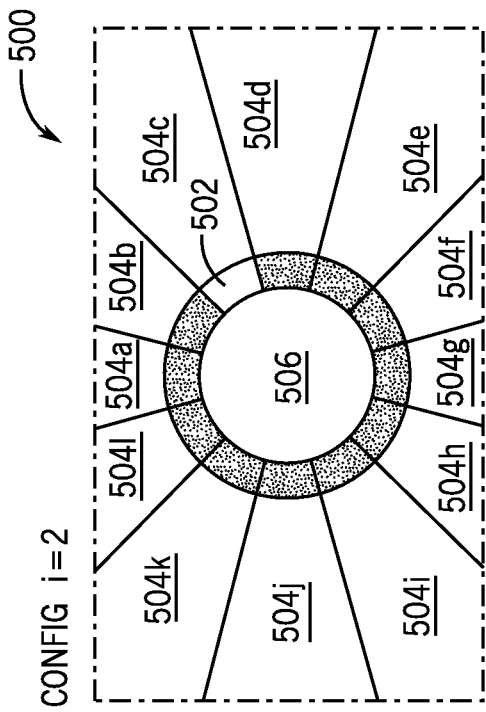
Figure 5B:
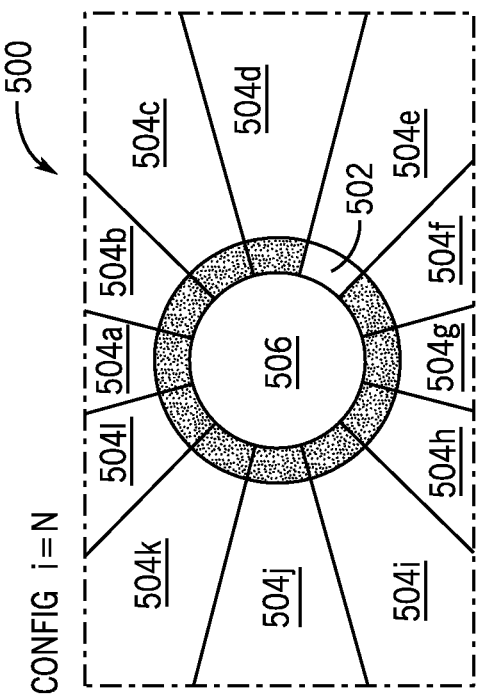
Figure 5C:
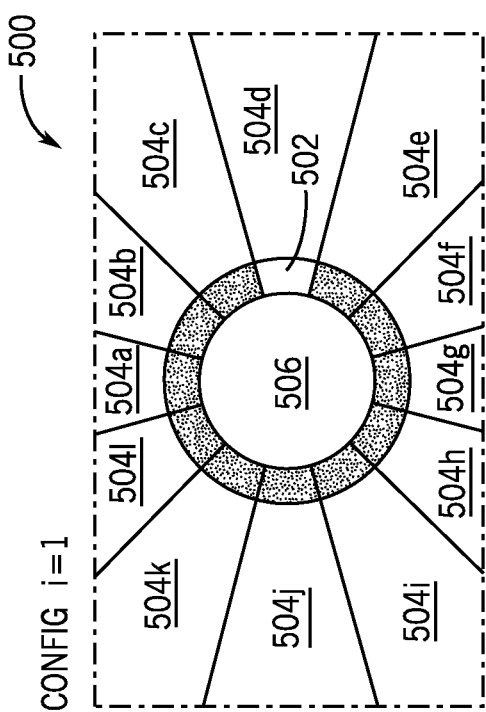
Figure 5D:
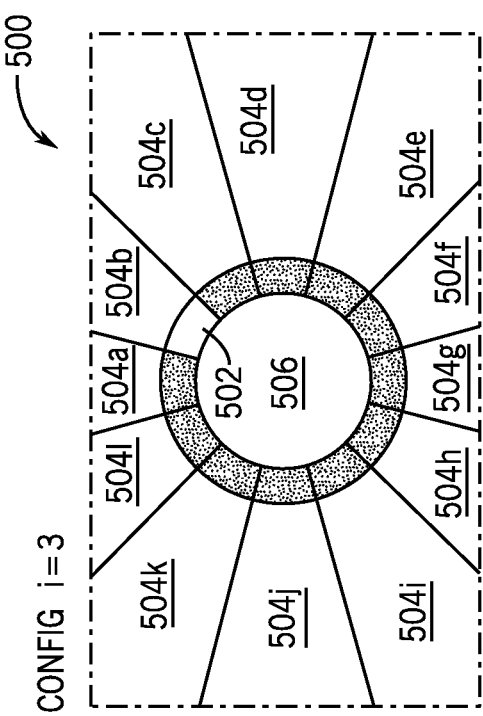

FIGS. 5A-5D illustrate the aperture 502 positioned at different azimuthal directions (i.e., spatial sectors) with respect to a well or formation, in accordance with various embodiments. At the spatial sections corresponding to the aperture 502, neutrons are directed toward the detector 506 and easily passing through the aperture to reach the detector 506. In some embodiments, the aperture 502 may rotate through a plurality of positions, and each of the plurality of positions may correspond to an azimuthal region 504a-504l or direction of the wellbore. For Example, FIG. 5A shows the aperture 502 at a position corresponding to azimuthal region 504d. FIG. 5B shows the aperture 502 at a position corresponding to azimuthal region 504c. FIG. 5C shows the aperture 502 at a position corresponding to azimuthal region 504b. FIG. 5D shows the aperture 502 at a position corresponding to azimuthal region 504e. The position of the aperture 502 at a given time is known and may be recorded alongside the data or involve a repeating pattern or a pattern generated by a recorded seed point. Thus, the measurement captured by the detector 506 as a given time can be attributed to the corresponding azimuthal region or direction 504a-504l. FIG. 6 illustrates a representative function 600 for obtaining measurements from a downhole logging tool with variable aperture positions, in accordance with various embodiments. As represented mathematically, the set of aperture positions forms a set of test functions in a matrix φ 604, resulting in a stack of measurements y 602 from the spatial distribution of nuclear origination x 606, or: y=φx, as illustrated in FIG. 6.

FIG. 7 illustrates an example representation of another embodiment of a downhole logging tool 700 with multiple apertures 708 in various positions 702, in accordance with various embodiments. As illustrated, there is a high-resolution pattern of apertures that changes over time from position i=1 up to configuration i=K. In the illustrated embodiments, the downhole logging tool 702 has multiple apertures 708 detecting signals (e.g., neutrons) from distinct azimuthal directions simultaneously while still using only one detector, although more than one detector may be used in other embodiments. This embodiments includes a randomized (or pseudo-randomized i.e. the random pattern can be generated from a starting seed, eliminating the need to store all of the aperture function data) aperture that allows a higher fraction of the neutrons from a volumetric surrounding to be captured simultaneously.

FIGS. 8A-8D illustrate a plurality of apertures 802 positioned at different azimuthal directions (i.e., spatial sectors) with respect to a well or formation, in accordance with various embodiments. In some embodiments, the plurality of apertures 802 may be exposed at the same time, and the position of each of the plurality of apertures may correspond to a distinct azimuthal region or direction 804a-804l of the well or formation. Another set of apertures 802 may be exposed subsequently. The changing position of the apertures 802 may be random or predetermined. The position of the plurality of apertures 802 at a given time is known. Thus, the measurement captured by the detector 806 at a given time can be attributed to signal incident from all the azimuthal regions or directions corresponding to the open apertures 802 at the given time. However, since there are multiple apertures 802 at one time, in order to provide azimuthal resolution, the measurement attributable to each azimuthal region needs to be determined. In some embodiments, this can be accomplished using a system of equations to solve for the measurement attributable to each azimuthal region, as described below.

FIG. 9 illustrates a representative aperture (or exposure) function 900 for obtaining measurements from a downhole logging tool with multiple changing aperture positions, in accordance with various embodiments. As represented mathematically, the set of aperture positions forms a set of test functions in a matrix φ 904, resulting in a stack of measurements y 902 from the spatial distribution of nuclear signal origination x 906. An individual y value ($y_i$) represents the measurement detected by the detector at a given time (given by discretized time index i). The corresponding φ entry ($i^{th}$ row of the matrix φ) represents which azimuthal regions were measured at discretized time=i, in which a 0 entry corresponds to no aperture being opened at that azimuthal position and no transmission and a 1 corresponds to having an aperture at that azimuthal position allowing free transmission of the nuclear signals. In practice, a closed aperture would likely not have 100% attenuation, thus 0 entries in the matrix could be increased to an appropriate nonzero transmission coefficient. The x values represent the underlying spatial distribution of signal originating in the various azimuthal regions, and are the unknowns to be solved for via matrix operations or algorithms.

FIG. 10 illustrates a cross-sectional representation of a downhole logging tool 1000 with concentric rotating sleeves 1002, 1004 for creating randomized (or pseudo-randomized) aperture positions, in accordance with various embodiments. The tool 100 may include two concentric sleeves 1002, 1004 or sleeve layers surrounding the detector 1006, in which each sleeve 1002, 1004 has a plurality of apertures 1008, 1010 formed at random or pseudo-random positions around the detector 1006. The sleeves 1002, 1004 may have apertures 1008, 1010 in different positions. The sleeves 1002, 1004 may be rotated with respect to each other. Thus, when apertures 1008, 1010 of the two sleeves 1002, 1004 overlap, a true aperture is created, exposing the detector 1006. As the apertures 1008, 1010 of the sleeves 1002, 1004 are rotated with respect to each other and the detector 1006, the set of aperture functions, φ 904, are generated, allowing individual azimuthal sector signal information, x 906, to be determined from total detector measurements, y 902, as shown in FIG. 9. In other words, the detector or detectors are not measuring the signal from each spatial sector individually, but rather are measuring an inner product of the spatial sector signals with the aperture encoding functions in φ 904.

FIG. 11 illustrates a perspective view of a downhole logging tool 1100 with multiple changing apertures 1102 along the azimuthal direction 1104 and along the longitudinal direction 1106 (i.e. along the long axis of the logging tool), in accordance with various embodiments. In some embodiments, in additional to providing azimuthal resolution through varying aperture positions along the circumferential direction 1104 of the tool 1100, the tool 1100 may also have varying aperture positions along the longitudinal direction 1106. Thus, the measurements resolution will not only include azimuthal direction but also depth (i.e. vertical resolution).

FIG. 12 illustrates formation and/or wellbore spatial segments 1202 corresponding to different aperture positions, in accordance with various embodiments. For example, as illustrated, the tool may have twelve possible aperture positions along the azimuthal direction 1204 and three possible aperture positions along the longitudinal direction 1206, and therefore thirty-six possible aperture positions in total. There may be more or fewer in other embodiments. By utilizing the aforementioned approach, the measurements attributable to each of the thirty-six aperture positions can be solved, given a suitable number of reconfigurations in the aperture encoding function, and thus the spatial wellbore sectors corresponding can be measured individually without significantly sacrificing detector sensitivity. In some embodiments, a weighting function may be used. In some embodiments, multiple detectors may be used. For example, FIG. 13 illustrates a perspective view of a downhole logging tool 1300 with multiple detectors 1302 and multiple aperture positions 1304 along the azimuthal direction and along the longitudinal direction, in accordance with various embodiments. In this case, spatial encoding is performed with the combination of 2D spatial aperture patterns and the known unique spatial locations of the individual detectors 1302.

FIG. 14 illustrates a cross-sectional representation of a downhole logging tool 1400 with concentric rotating sleeves 1402 for creating randomized apertures 1406 with varying degrees of openness, in accordance with various embodiments. In this example, there are three sleeves (e.g., sleeve layers) 1402a, 1402b, 1402c each having apertures 1406 in various positions. As the sleeves 1402a, 1402b, 1402c are rotated with respect to each other, the apertures 1406 are in different positions. In the illustrated embodiment, the tool 1400 provides twelve azimuthal positions 1404a-1404l, and each azimuthal position may have one of four possible aperture states. A first possible aperture state 1410 is that each sleeve 1402a, 1402b, 1402c has an aperture 1406 open at a common azimuthal position, such as the detector 1408 is completely exposed from signal originating at the corresponding azimuthal spatial sector. A second possible state 1412 is that two of the sleeves 1402a, 1402c have an aperture 1406 open at a common azimuthal position, and there is only one sleeve layer 1402b obstructing the detector 1408. A third possible aperture state 1414 is that only one of the sleeves 1402c has an aperture 1406 open at that azimuthal position, and there are two sleeve layers 1402a, 1402b obstructing the detector 1408. A fourth possible aperture state 1416 is that none of the sleeves 1402a, 1402b, 1402c have an aperture 1406 open at that azimuthal position, and all three sleeve layers are obstructing the detector 1408. Each of these states provides a different level of attenuation, and creates a non-binary weighting in the aperture function.

FIG. 15 illustrates a representative function 1500 for obtaining measurements from the downhole logging tool of FIG. 14 with apertures of varying levels of openness, in accordance with various embodiments. As represented mathematically, the set of aperture positions forms a set of test functions in a matrix φ 1502, resulting in a stack of measurements y 1512 from the spatial distribution of nuclear signal origination x 1514. As illustrated, the aperture function, φ 1502, has four possible values, corresponding to the four aperture states 1410, 1412, 1414, 1416 described above. For example, the aperture state 1410 with all three apertures aligned may correspond to a 1 value 1504, the aperture state 1412 with two apertures aligned may correspond to the 0.66 value 1506, the aperture state 1414 with one aperture open may correspond to the 0.33 state 1508, and the aperture state 1416 with no apertures at that location may correspond to the 0 value 1510. In practice, these attenuation values may be appropriately adjusted based on calibration data since even a "closed" aperture setting may result in the passage of nuclear particles to the detector. With reference to the functions of FIGS. 6, 9, and 15, the matrix φ may not fixed and may will change with the varying aperture position and size. In some embodiments, the tool 200 includes electronics that keep track of the aperture positions and sizes. This information is then used in constructing aperture functions.

In some embodiments, compressed sensing (i.e., compressive sensing or compressive sampling) techniques may be utilized to further enhance the above described systems. Such techniques may reduce the requirement of sensors/data acquisition systems by taking advantage of specific signal properties. Instead of requiring the need to sample above the Nyquist frequency (i.e. at a rate more than 2 times the highest signal frequency), sampling rates can be greatly reduced by exploiting sparsity in the data, even if that sparsity is in a transform domain such as the Fourier, Wavelet, Discrete Cosine, or Gabor transform domain. In some embodiments, the compressed sensing framework provides several benefits including: reducing time required to acquire image/data sets and/or reducing the number of sensors necessary to provide spatial data reconstruction. This is particularly important, as many applications requiring "expensive" sensors, either by monetary cost, size, availability, etc. are not feasible or prohibit development, and there are often many constraints to well operations and environments, such as time and borehole size.

In some embodiments, instead of sampling one of the N azimuthal bins at a time (as illustrated in FIG. 4), the inner product of the volumetric nuclear information with the random or pseudo-random apertures is sampled K times (as illustrated in FIG. 7), where K is much lower than N. In mathematical terms, our set of randomized apertures forms a set of test functions in a matrix φ, resulting in a stack of measurements y from the spatial distribution of nuclear information x, or: y=φx, as illustrated in FIG. 9. Because K<N, there is a dimensionality reduction in the transformation from x to y that loses information in general. However, through compressive sensing, the φ matrix can be designed such that a compressible x can be recovered substantially perfectly from the reduced set of measurements y. In some embodiments, the φ matrix must be comprised of independent and identically distributed (IID) random variables, a property satisfied by a Gaussian random matrix (i.e. the randomized aperture) for example.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

We claim:

1. A downhole logging tool, comprising:
 a radiation generation source operable to emit radiation into a formation surrounding the tool;
 a radiation detector fixed relative to the radiation generation source and operable to detect backscattered radiation from the formation surrounding the tool; and
 a sleeve positioned radially around the radiation detector to shield the radiation detector from a first portion of the backscattered radiation, the sleeve comprising a plurality of layers rotatable with respect to each other, each layer having one or more layer apertures that form at least one aperture in the sleeve when aligned, the at least one aperture exposing the radiation detector to a second portion of the backscattered radiation, the second portion of the backscattered radiation emanating from an inspected region of the formation facing the at least one aperture, wherein a signal detected at the radiation detector corresponds to the inspected region of the formation, and wherein the position of the at least one aperture is changeable with respect to the formation to distinctly inspect different regions of the formation.

2. The system of claim 1, wherein the sleeve and the least one aperture are rotatable with respect to the radiation detector or the formation.

3. The system of claim 1, wherein the sleeve includes one or more sections openable to create the at least one aperture.

4. The system of claim 1, wherein the positions of the at least one aperture of the detector corresponds respectively to one or more azimuthal directions with respect to the formation and are changeable across a plurality of different azimuthal directions.

5. The system of claim 1, wherein the positions of the at least one aperture with respect to the formation are changeable across a plurality of different axial positions.

6. The system of claim 1, wherein a complete aperture occurs when the layer apertures of the plurality of layers are aligned.

7. The system of claim 6, wherein a partial aperture occurs where at least a layer aperture of a first layer of the plurality of layers is aligned with a non-aperture portion a second layer of the plurality of layers.

8. A system for performing downhole logging operations in a well, comprising:
   a downhole suspension device;
   an inspection tool coupled to and lowerable into the well via the suspension device, the inspection tool comprising:
   a radiation source operable to emit radiation;
   a radiation detector operable to detect backscattered radiation generated as a result of the radiation emitted from the radiation source; and
   a sleeve positioned radially around the radiation detector, the sleeve comprising a plurality of layers rotatable with respect to each other, each layer having one or more layer apertures that form at least one aperture in the sleeve when aligned, wherein the position of the at least one aperture is changeable with respect to the well.

9. The system of claim 8, wherein the sleeve and the least one aperture are rotatable with respect to the radiation detector.

10. The system of claim 8, wherein the sleeve includes one or more windows openable to create the at least one aperture.

11. The system of claim 8, wherein the position of the at least one aperture is changeable across a plurality of different azimuthal positions of the well.

12. The system of claim 8, wherein the position of the at least one aperture is changeable across a plurality of different axial positions of the well.

13. The system of claim 8, wherein a complete aperture occurs when the layer apertures of the plurality of layers are aligned.

14. The system of claim 13, wherein a partial aperture occurs where at least a layer aperture of a first layer of the plurality of layers is aligned with a non-aperture portion a second layer of the plurality of layers.

15. A method of performing downhole logging, comprising:
   positioning an inspection tool in a well, the inspection tool comprising a radiation generation source, a radiation detector, and a sleeve positioned radially around the radiation detector at a first position with respect to the well, the sleeve comprising a plurality of layers rotatable with respect to each other, each layer having one or more layer apertures that form at least one aperture in the sleeve when aligned;
   emitting radiation from the radiation generation source;
   detecting backscattered radiation received at the radiation detector via the at least one aperture;
   determining a first measurement based on the detected backscattered radiation;
   associating the first measurement with a first region of the well corresponding to the first position; and
   determining one or more characteristics of the first region of the well based at least in part on the first measurement.

16. The method of claim 15, further comprising:
   changing the position of the at least one aperture to a second position with respect to the well, the second position corresponding to a second region of the well;
   determining a second measurement based on the backscattered radiation;
   associating the second measurement with the second region of the well; and
   determining one or more characteristics of the second portion of the well based at least in part on the second measurement.

17. The method of claim 16, further comprising:
   moving the position of the at least one aperture axially or azimuthally with respect to the well.

18. The method of claim 15, further comprising:
   tracking the position of the at least one aperture; and
   constructing an aperture function based at least in part on the tracked position.

19. The method of claim 18, further comprising:
   rotating the sleeve around the detector to change the position of the at least one aperture with respect to the well.

20. The method of claim 18, further comprising:
   rotating the inspection tool to change the position of the at least one aperture with respect to the well.

* * * * *